United States Patent
Matsumoto (10) Patent No.: US 11,242,448 B2
(45) Date of Patent: *Feb. 8, 2022

(54) RUBBER COMPOSITION FOR TIRE AND TIRE

(71) Applicant: SUMITOMO RUBBER INDUSTRIES, LTD., Kobe (JP)

(72) Inventor: Norihiro Matsumoto, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/461,244

(22) PCT Filed: Nov. 28, 2017

(86) PCT No.: PCT/JP2017/042639
§ 371 (c)(1),
(2) Date: May 15, 2019

(87) PCT Pub. No.: WO2018/101266
PCT Pub. Date: Jun. 7, 2018

(65) Prior Publication Data
US 2019/0315946 A1 Oct. 17, 2019

(30) Foreign Application Priority Data
Nov. 30, 2016 (JP) .............................. JP2016-232626

(51) Int. Cl.
*C08L 9/06* (2006.01)
*B60C 1/00* (2006.01)
(Continued)

(52) U.S. Cl.
CPC .................................. *C08L 9/06* (2013.01);
*B60C 1/00* (2013.01); *B60C 1/0016* (2013.01);
(Continued)

(58) Field of Classification Search
CPC ..... B60C 1/0016; B60C 1/00; B60C 11/0008; B60C 2011/0025; C08L 9/06; C08L 9/00;
(Continued)

(56) References Cited

U.S. PATENT DOCUMENTS

2011/0184085 A1* 7/2011 Otsubo ...................... C08L 7/00
523/156
2014/0128532 A1 5/2014 Nakamura et al.
(Continued)

FOREIGN PATENT DOCUMENTS

CN 103804724 A 5/2014
CN 103837556 A 6/2014
(Continued)

OTHER PUBLICATIONS

Carbon Black, Encyclopedia of Polymer Science and Technology, Wang et al. (Year: 2003).*

(Continued)

*Primary Examiner* — Angela C Scott
(74) *Attorney, Agent, or Firm* — Birch, Stewart, Kolasch & Birch, LLP (57) ABSTRACT

Provided is a rubber composition for tires having low tan δ at approximately 60° C. and excellent fracture energy at approximately 25° C. Included is a rubber composition for tires, containing a rubber component including an isoprene-based rubber, the rubber composition having a correlation length $\Xi_b$ of 55 nm or less as determined by fitting the following Equations 1 to 6 to a scattering intensity curve I(q) obtained by X-ray scattering analysis or neutron scattering analysis:

$$I_{(q)} = \frac{A}{1+q^2\xi^2} + \frac{B}{(1+q^2\Xi_b^2)^2} + \frac{C}{(1+q^2\Xi_c^2)^2} \quad \text{(Equation 1)}$$

$$\xi < \Xi_b < \Xi_c \quad \text{(Equation 2)}$$

$$A = 8\pi N_a \sigma^2 \xi^3 \quad \text{(Equation 3)}$$

$$B = 4\pi N_b \sigma^2 \Xi_b^2 \quad \text{(Equation 4)}$$

$$C = 4\pi N_c \sigma^2 \Xi_c^2 \quad \text{(Equation 5)}$$

$$q = \frac{4\pi \sin\frac{\theta}{2}}{\lambda} \quad \text{(Equation 6)}$$

$A, B, C, \xi, \Xi_b, \Xi_c$: fitting parameter $q$: scattering vector $N_a$: number per unit volume (number/cm³)
  of scatterers having a correlation length $\xi$ $N_b$: number per unit volume (number/cm³)
  of scatterers having a correlation length $\Xi_b$ $N_c$: number per unit volume (number/cm³)
  of scatterers having a correlation length $\Xi_c$ $\sigma$: electron density difference (electron·(cm⁻³))
  between scatterers and the surrounding matrix,
  or scattering length density difference (cm⁻²) between
  scatterers and the surrounding deuterated solvent $\theta$: scattering angle $\lambda$: wavelength of X rays or neutrons

4 Claims, 1 Drawing Sheet

(51) Int. Cl.
*B60C 11/00* (2006.01)
*C08L 7/02* (2006.01)
*C08L 9/00* (2006.01)

(52) U.S. Cl.
CPC ............ *B60C 11/0008* (2013.01); *C08L 7/02* (2013.01); *C08L 9/00* (2013.01); *B60C 2011/0025* (2013.01); *C08L 2205/025* (2013.01); *C08L 2205/03* (2013.01); *C08L 2310/00* (2013.01)

(58) Field of Classification Search
CPC .. C08L 7/02; C08L 2205/03; C08L 2205/025; C08L 2310/00
USPC .......................................................... 525/55
See application file for complete search history.

(56) References Cited

U.S. PATENT DOCUMENTS

| | | | |
|---|---|---|---|
| 2014/0140483 A1 | 5/2014 | Mashita et al. | |
| 2018/0016402 A1 | 1/2018 | Miyazaki et al. | |
| 2018/0305469 A1* | 10/2018 | Matsumoto | G01N 23/185 |

FOREIGN PATENT DOCUMENTS

| | | | |
|---|---|---|---|
| CN | 104292520 | B * | 9/2016 |
| CN | 106079128 | A | 11/2016 |
| JP | 2010-95670 | A | 4/2010 |
| JP | 2013-194088 | A | 9/2013 |
| JP | 2014-95020 | A | 5/2014 |
| JP | 2015-10136 | A | 1/2015 |
| JP | 5658219 | B2 | 1/2015 |
| JP | 2015-30815 | A | 2/2015 |
| JP | 2015-86318 | A | 5/2015 |
| JP | 2015-98539 | A | 5/2015 |
| JP | 2015-137311 | A | 7/2015 |
| JP | 2015-209536 | A | 11/2015 |
| WO | WO 2016/136453 | A1 | 9/2016 |

OTHER PUBLICATIONS

English machine translation of CN 104292520 (Year: 2016).*
Ikeda et al. "Vulcanization: New Focus on a Traditional Technology by Small-Angle Neutron Scattering", Macromolecules, 2009, 42, p. 2741-2748.
International Search Report, issued in PCT/JP2017/042639, PCT/ISA/210, dated Jan. 23, 2018.
Written Opinion of the International Searching Authority, issued in PCT/JP2017/042639, PCT/ISA/237, dated Jan. 23, 2018.

* cited by examiner

RUBBER COMPOSITION FOR TIRE AND TIRE

TECHNICAL FIELD

The present invention relates to a rubber composition for tires, and a tire.

BACKGROUND ART

Along with the trend toward carbon dioxide emission control due to the increased attention on environmental issues these days, the demand for fuel efficient cars has been increasing. This has created a further need for tires with reduced rolling resistance.

The crosslinked structure of rubber compositions for tires is known to correlate with their physical properties. Thus, various techniques have been developed for analyzing the crosslinked structure (for example, Patent Literature 1 and Non-Patent Literature 1). Patent Literature 1 reports, for example, that rubber compositions having a homogeneously crosslinked structure show lower energy loss; however, no method for providing a homogeneously crosslinked structure has been sufficiently studied.

CITATION LIST

Patent Literature

Patent Literature 1: JP 5658219 B

Non Patent Literature

Non-Patent Literature 1: Yuko Ikeda et al., Vulcanization: New Focus on a Traditional Technology by Small-Angle Neutron Scattering, Macromolecules 2009, 42, 2741-2748

SUMMARY OF INVENTION

Technical Problem

The studies of the present inventor have revealed that tan $\delta$ at approximately 60° C. and fracture energy (the quotient obtained by dividing the product of tensile strength at break and elongation at break by two) at approximately 25° C. may be simultaneously improved by controlling the crosslinked structure.

The present invention aims to provide a rubber composition for tires having low tan $\delta$ at approximately 60° C. and excellent fracture energy at approximately 25° C.

Solution to Problem

As a result of intensive efforts to achieve the goal, the present inventor has found that when a rubber composition containing an isoprene-based rubber is controlled to have a crosslinked structure with a reduced correlation length $\Xi_b$, wherein the correlation length $\Xi_b$ is determined by fitting the Equations 1 to 6 below to a scattering intensity curve I(q) obtained by X-ray scattering analysis or neutron scattering analysis, tires including the crosslinked rubber composition can achieve sufficiently reduced energy loss and sufficiently improved fracture properties. Based on this finding, the present invention has been completed.

Specifically, the rubber composition for tires of the present invention contains a rubber component including an isoprene-based rubber, and has a correlation length $\Xi_b$ of 55 nm or less as determined by fitting the following Equations 1 to 6 to a scattering intensity curve I(q) obtained by X-ray scattering analysis or neutron scattering analysis:

$$I_{(q)} = \frac{A}{1+q^2\xi^2} + \frac{B}{(1+q^2\Xi_b^2)^2} + \frac{C}{(1+q^2\Xi_c^2)^2} \quad \text{(Equation 1)}$$

$$\xi < \Xi_b < \Xi_c \quad \text{(Equation 2)}$$

$$A = 8\pi N_a \sigma^2 \xi^3 \quad \text{(Equation 3)}$$

$$B = 4\pi N_b \sigma^2 \Xi_b^2 \quad \text{(Equation 4)}$$

$$C = 4\pi N_c \sigma^2 \Xi_c^2 \quad \text{(Equation 5)}$$

$$q = \frac{4\pi \sin\frac{\theta}{2}}{\lambda} \quad \text{(Equation 6)}$$

$A, B, C, \xi, \Xi_b, \Xi_c$: fitting parameter $q$: scattering vector $N_a$: number per unit volume (number/cm$^3$) of scatterers having a correlation length $\xi$ $N_b$: number per unit volume (number/cm$^3$) of scatterers having a correlation length $\Xi_b$ $N_c$: number per unit volume (number/cm$^3$) of scatterers having a correlation length $\Xi_c$ $\sigma$: electron density difference (electron·(cm$^{-3}$)) between scatterers and the surrounding matrix, or scattering length density difference (cm$^{-2}$) between scatterers and the surrounding deuterated solvent $\theta$: scattering angle $\lambda$: wavelength of X rays or neutrons Preferably, the X-ray scattering analysis is small-angle X-ray scattering analysis, and the neutron scattering analysis is small-angle neutron scattering analysis.

The value of q defined by Equation 6 is preferably 10 nm$^{-1}$ or less.

Another aspect of the present invention is a tire, including the rubber composition for tires.

Advantageous Effects of Invention

The rubber composition of the present invention contains an isoprene-based rubber, and has a correlation length $\Xi_b$ within a predetermined range as determined by fitting Equations 1 to 6 to a scattering intensity curve I(q) obtained by X-ray scattering analysis or neutron scattering analysis. Such a rubber composition for tires has low tan $\delta$ at approximately 60° C. and excellent fracture energy at approximately 25° C.

DESCRIPTION OF EMBODIMENTS

Figure 1:
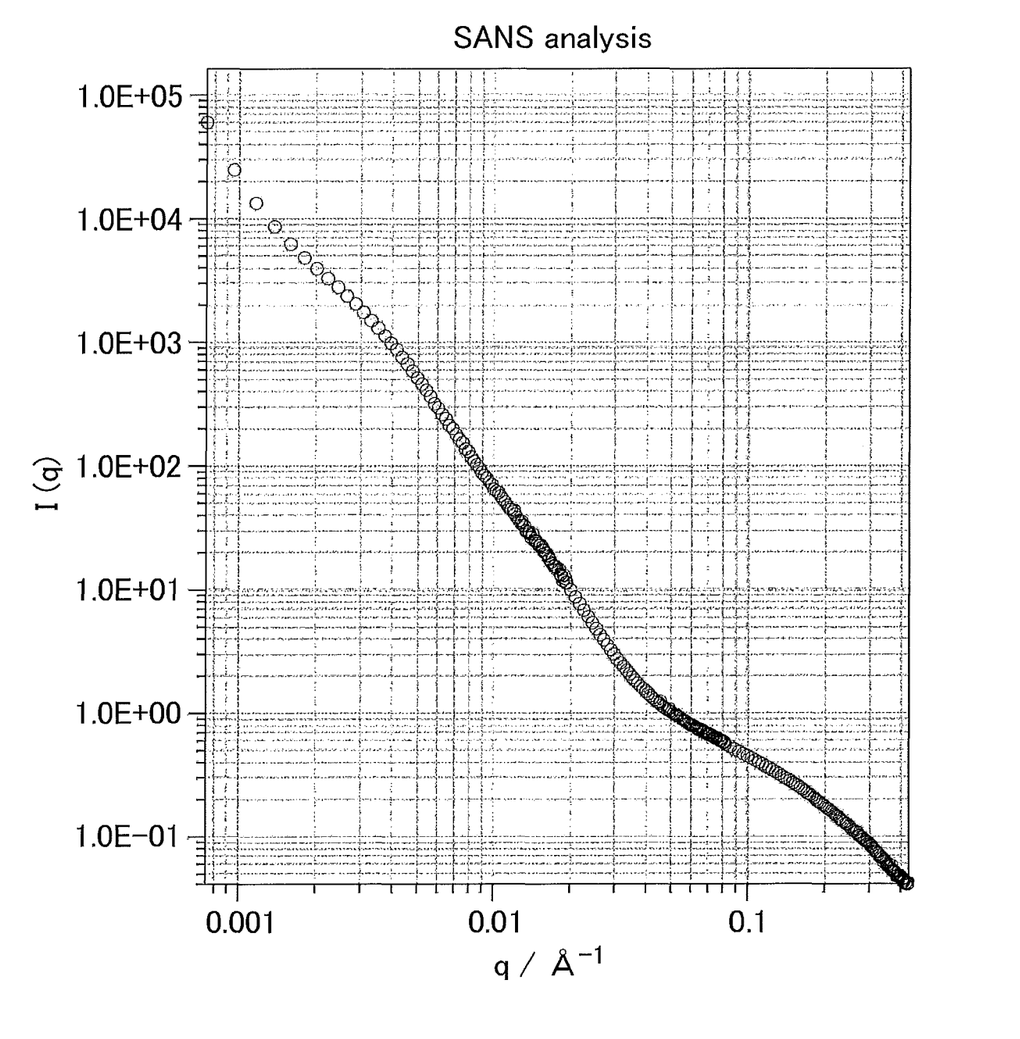
FIG. 1 illustrates an exemplary scattering intensity curve obtained by SANS analysis.

The rubber composition for tires of the present invention contains a rubber component including an isoprene-based rubber, and has a correlation length $\Xi_b$ of 55 nm or less as determined by fitting Equations 1 to 6 to a scattering intensity curve I(q) (for example, FIG. 1) obtained by X-ray scattering analysis or neutron scattering analysis.

Among the fitting parameters obtained by the curve fitting, a correlation length $\xi$ ranging from 1 nm to 100 μm is assumed to correspond to the distance between cross-linking points in the polymer, and a correlation length $\Xi_b$ ranging from 0.1 nm to 100 μm is assumed to correspond to the size of network inhomogeneities in the polymer. The correlation length $\Xi_b$ ranging from 0.1 nm to 100 μm is considered to be the most important factor of the crosslinked structure of the rubber composition, and it is considered that both low tan δ at approximately 60° C. and high fracture energy at approximately 25° C. can be achieved by controlling this parameter.

The correlation length $\Xi_b$ in the present invention is measured on plate-like samples having a thickness of about 1 mm, a length of about 16 mm, and a width of about 16 mm. For tire samples, the measurement may be performed on such plate-like samples cut out of tire components such as treads of vulcanized tires.

The curve fitting is carried out by least squares.

In the present invention, both low tan δ at approximately 60° C. and high fracture energy at approximately 25° C. are achieved by controlling the correlation length $\Xi_b$ to 55 nm or less. In order to further reduce tan δ at appropriately 60° C. and, at the same time, further increase fracture energy at appropriately 25° C., the correlation length $\Xi_b$ is preferably 35 nm or less, more preferably 25 nm or less, particularly preferably 15 nm or less. The lower limit of $\Xi_b$ is not particularly critical and is preferably as small as possible.

The X-ray scattering analysis may suitably be small-angle X-ray scattering (SAXS) analysis (scattering angle: typically 10 degrees or smaller) in which polymer materials may be irradiated with X-rays to measure the scattering intensity.

In the small-angle X-ray scattering analysis, structural information of a substance may be obtained by measuring the X-rays scattered at small scattering angles among the scattered X-rays resulting from the irradiation of the substance with X-rays. In this way, ordered structures on the order of a few nanometers such as microphase-separated structures of polymer materials may be analyzed.

To obtain detailed molecular structural information, the SAXS analysis should desirably be able to measure an X-ray scattering profile with a high S/N ratio. Thus, the X-rays emitted from a synchrotron preferably have a brilliance of at least $10^{10}$ (photons/s/mrad$^2$/mm$^2$/0.1% bw).

The symbol bw denotes the band width of X-rays emitted from a synchrotron. Examples of such synchrotrons include the beamlines BL03XU and BL20XU of the large synchrotron radiation facility "SPring-8" belonging to Japan Synchrotron Radiation Research Institute.

The term "S/N ratio" is an abbreviation of "signal/noise ratio" calculated by dividing the signal variance by the noise variance.

The brilliance (photons/s/mrad$^2$/mm$^2$/0.1% bw) of the X-rays is preferably $10^{10}$ or higher, more preferably $10^{12}$ or higher. The upper limit is not particularly critical, but the X-ray intensity used is preferably low enough not to cause radiation damage.

The number of photons (photons/s) in the X-rays is preferably $10^7$ or more, more preferably $10^9$ or more. The upper limit is not particularly critical, but the X-ray intensity used is preferably low enough not to cause radiation damage.

The neutron scattering analysis may suitably be small-angle neutron scattering (SANS) analysis (scattering angle: typically 10 degrees or smaller) in which polymer materials may be irradiated with neutrons to measure the scattering intensity.

In the small-angle neutron scattering analysis, structural information of a substance may be obtained by measuring the neutrons scattered at small scattering angles among the scattered neutrons resulting from the irradiation of the substance with neutrons. In this way, ordered structures on the order of a few nanometers such as microphase-separated structures of polymer materials may be analyzed.

The SANS analysis may involve known magnetic structure-based techniques or deuteration techniques. When deuteration techniques are used, for example, a polymer material may be swollen in a deuterated solvent, and the polymer material in equilibrium in the deuterated solvent may be irradiated with neutrons to measure the scattering intensity. Examples of such deuterated solvents for swelling polymer materials include heavy water, deuterated hexane, deuterated toluene, deuterated chloroform, deuterated methanol, deuterated DMSO (($D_3C$)$_2$S=O), deuterated tetrahydrofuran, deuterated acetonitrile, deuterated dichloromethane, deuterated benzene, and deuterated N,N-dimethylformamide.

The neutrons used in the neutron scattering analysis such as SANS may be obtained from, for example, the SANS-J beamline at the JRR-3 research reactor belonging to Japan Atomic Energy Agency, Independent Administrative Agency.

The flux density (neutrons/cm$^2$/s) of the neutrons is preferably $10^3$ or higher, more preferably $10^4$ or higher, in order to obtain a neutron scattering profile with a high S/N ratio, as in the case with the SAXS analysis. The upper limit is not particularly critical, and the neutron flux density used is preferably low enough not to cause radiation damage.

In the X-ray or neutron scattering analysis, since finer molecular structures of polymer materials need to be measured, the analysis is preferably carried out under conditions where the value of q defined by Equation 6 is in a range of 10 nm$^{-1}$ or less. The q range is more preferably 20 nm$^{-1}$ or less because a greater numerical value desirably leads to smaller pieces of information.

The X-rays scattered in the SAXS analysis may be detected by an X-ray detector, and an image may then be generated by, for example, an image processor using the X-ray detection data from the X-ray detector.

Examples of the X-ray detector include two-dimensional detectors such as X-ray films, nuclear emulsion plates, X-ray image pickup tubes, X-ray fluorescent amplifiers, X-ray image intensifiers, X-ray imaging plates, X-ray CCDs, and X-ray amorphous materials; and line sensor one-dimensional detectors. The X-ray detector may be selected appropriately depending on the type or conditions of the polymer material to be analyzed, or other factors.

The image processor may appropriately be a common one that can generate X-ray scattering images based on the X-ray detection data from the X-ray detector.

The SANS analysis may also be carried out based on the same principle as in the SAXS analysis; the neutrons scattered may be detected by a neutron detector, and an image may then be generated by, for example, an image processor using the neutron detection data from the neutron detector. Similarly as above, the neutron detector may be a known two-dimensional detector or one-dimensional detector, and the image processor may be a known one that can generate neutron scattering images. These devices may be appropriately selected.

The rubber composition of the present invention contains an isoprene-based rubber. Examples of the isoprene-based rubber include natural rubber (NR), synthetic polyisoprene rubber (IR), modified NR or IR obtained by modifying NR or IR, refined NR obtained by partly or completely removing phospholipids and proteins from NR, copolymers of isoprene and other monomers, and liquid IR. These isoprene-based rubbers may be used alone or in combinations of two or more. In addition to the isoprene-based rubber, the rubber composition of the present invention may also contain other materials usable in the field of tires.

For example, the rubber component of the rubber composition of the present invention may include additional rubbers other than the isoprene-based rubber. Preferred additional rubbers are those which, like isoprene-based rubbers, can generate stable tertiary radicals. Rubbers that cannot generate tertiary radicals, such as styrene butadiene rubber (SBR) and polybutadiene rubber (BR) may also be used. Butyl-based rubbers may be used as well.

The SBR, if used, may be any SBR commonly used in the tire industry. Examples include emulsion-polymerized styrene butadiene rubber (E-SBR) and solution-polymerized styrene butadiene rubber (S-SBR).

The BR, if used, may be any BR commonly used in the tire industry. Examples include high-cis BR such as BR 1220 available from Zeon Corporation and BR130B and BR150B both available from Ube Industries, Ltd., and BR containing syndiotactic polybutadiene crystals such as VCR412 and VCR617 both available from Ube Industries, Ltd.

The butyl-based rubber, if used, may be any butyl-based rubber commonly used in the tire industry. Examples include butyl rubber (IIR) and halogenated butyl rubbers (X-IIR) such as brominated butyl rubber (Br-IIR) and chlorinated butyl rubber (Cl-IIR).

To facilitate the formation of a further homogeneously crosslinked structure, the amount of the isoprene-based rubber based on 100% by mass of the rubber component in the rubber composition of the present invention is preferably at least 1% by mass or at least 20% by mass, more preferably at least 50% by mass or at least 70% by mass, still more preferably at least 90% by mass, and may be 100% by mass. The amount of each additional rubber other than the isoprene-based rubber is preferably at most 99% by mass or at most 80% by mass, more preferably at most 50% by mass or at most 30% by mass, still more preferably at most 10% by mass, and may be 0% by mass.

The rubber composition of the present invention may contain carbon black, for example. Any carbon black commonly used in the tire industry may be used. Examples include N134, N110, N220, N234, N219, N339, N330, N326, N351, N550, and N762. The amount of the carbon black, if used, per 100 parts by mass of the rubber component is preferably at least 1 part by mass or at least 15 parts by mass, more preferably at least 30 parts by mass, but is preferably at most 100 parts by mass, more preferably at most 80 parts by mass.

The rubber composition of the present invention may contain silica, for example. Any silica commonly used in the tire industry may be used. Examples include dry silica (anhydrous silica) and wet silica (hydrous silica). The amount of the silica, if used, per 100 parts by mass of the rubber component is preferably at least 1 part by mass or at least 15 parts by mass, more preferably at least 30 parts by mass, but is preferably at most 200 parts by mass, more preferably at most 150 parts by mass.

When the rubber composition contains silica, it may also contain a silane coupling agent. Any silane coupling agent commonly used in the tire industry may be used. Examples include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl) tetrasulfide, bis(2-triethoxysilylethyl)trisulfide, bis(4-trimethoxysilylbutyl)trisulfide, bis(3-triethoxysilylpropyl) disulfide, bis(2-triethoxysilylethyl)disulfide, bis(4-triethoxysilylbutyl)disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N, N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. The amount of the silane coupling agent, if used, per 100 parts by mass of the silica is preferably 1 part by mass or more but is preferably 15 parts by mass or less.

Any filler other than carbon black and silica commonly used in the tire industry may be used, including, for example, inorganic fillers such as aluminum hydroxide, talc, mica, magnesium oxide, magnesium sulfate, titanium white, titanium black, calcium oxide, calcium hydroxide, magnesium aluminum oxide, clay, pyrophyllite, bentonite, aluminum silicate, magnesium silicate, calcium silicate, aluminum calcium silicate, magnesium silicate, silicon carbide, zirconium, and zirconium oxide; and organic fillers such as short fibers and cellulose nanofibers.

The rubber composition of the present invention may contain a resin, for example. Any resin commonly used in the tire industry may be used. Examples include aromatic petroleum resins, terpene resins, dicyclopentadiene (DCPD) resins, coumarone-indene resins, α-methylstyrene resins, p-t-butylphenol acetylene resins, and acrylic resins. The amount of the resin, if used, per 100 parts by mass of the rubber component is preferably at least 1 part by mass or at least 15 parts by mass, more preferably at least 30 parts by mass, but is preferably at most 200 parts by mass, more preferably at most 150 parts by mass.

The rubber composition of the present invention may contain an antioxidant, for example. Any antioxidant commonly used in the tire industry may be used. Examples include naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis-[methylene-3-(3',5'-di-t-butyl-4'-hydroxyphenyl)-propionate]methane. The amount of the antioxidant, if used, per 100 parts by mass of the rubber component is preferably 0.1 parts by mass or more, more preferably 0.5 parts by mass or more, but is preferably 5 parts by mass or less, more preferably 3 parts by mass or less.

The rubber composition of the present invention may contain an oil, for example. Any oil commonly used in the tire industry may be used. Examples include process oils such as paraffinic process oils, aromatic process oils, and naphthenic process oils; and plant oils such as castor oil, cottonseed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. The amount of the oil, if used, per 100 parts by mass of the rubber component is preferably 1 part by mass or more, but is preferably 100 parts by mass or less.

The rubber composition of the present invention may contain a wax, for example. Any wax commonly used in the tire industry may be used. Examples include petroleum waxes such as paraffin waxes and microcrystalline waxes; naturally occurring waxes such as plant waxes and animal waxes; and synthetic waxes such as polymers of ethylene, propylene, or other monomers. The amount of the wax, if used, per 100 parts by mass of the rubber component is preferably 0.1 parts by mass or more, but is preferably 10 parts by mass or less.

The rubber composition of the present invention may contain a processing aid, for example. Any processing aid commonly used in the tire industry may be used. Examples include fatty acid metal salts, fatty acid amides, amide esters, silica surface activators, fatty acid esters, mixtures of fatty acid metal salts and amide esters, and mixtures of fatty acid metal salts and fatty acid amides. The amount of the processing aid, if used, per 100 parts by mass of the rubber component is preferably 0.1 parts by mass or more, but is preferably 10 parts by mass or less.

The rubber composition of the present invention may contain sulfur, for example. The amount of the sulfur, if used, per 100 parts by mass of the rubber component is preferably 0.5 parts by mass or more, more preferably 1.5 parts by mass or more, but is preferably 6 parts by mass or less, more preferably 4 parts by mass or less.

The rubber composition of the present invention may contain a vulcanization accelerator, for example. Any vulcanization accelerator commonly used in the tire industry may be used. Examples include guanidine vulcanization accelerators, sulfenamide vulcanization accelerators, thiazole vulcanization accelerators, thiuram vulcanization accelerators, dithiocarbamate vulcanization accelerators, thiourea vulcanization accelerators, and xanthate vulcanization accelerators. These vulcanization accelerators may be used alone or in combinations of two or more. Sulfenamide vulcanization accelerators are preferred among these, and the following sulfenamide vulcanization accelerators may be used: N-cyclohexyl-2-benzothiazolylsulfenamide (CZ), N-oxydiethylene-2-benzothiazolylsulfenamide (OBS), N-(tert-butyl)-2-benzothiazolylsulfenamide (TBBS), N-(tert-butyl)-2-benzothiazolylsulfenimide (TBSI), N,N-dicyclohexylbenzothiazole-2-sulfenamide (DCBS), and N,N-diisopropylbenzothiazole-2-sulfenamide (DIBS).

The amount of the vulcanization accelerator, if used, per 100 parts by mass of the rubber component is preferably 0.5 parts by mass or more, more preferably 1.5 parts by mass or more, but is preferably 6 parts by mass or less, more preferably 4 parts by mass or less.

The rubber composition of the present invention may contain zinc oxide, for example. The amount of the zinc oxide, if used, per 100 parts by mass of the rubber component is preferably 1 part by mass or more, more preferably 2 parts by mass or more, but is preferably 8 parts by mass or less, more preferably 6 parts by mass or less.

The rubber composition of the present invention may contain stearic acid, for example. The amount of the stearic acid, if used, per 100 parts by mass of the rubber component is preferably 1 part by mass or more, more preferably 2 parts by mass or more, but is preferably 8 parts by mass or less, more preferably 6 parts by mass or less.

The rubber composition of the present invention is used in tire applications. The rubber composition of the present invention is preferably used for treads of tires. It may also be used for various tire components such as sidewalls, base treads, undertreads, clinch apexes, bead apexes, breaker cushion rubbers, carcass cord topping rubbers, insulations, chafers, innerliners, and side reinforcing layers of run-flat tires. The type of tire to which the rubber composition may be applied is preferably a pneumatic tire. Besides, the rubber composition may also be applied to pneumatic or non-pneumatic tires for passenger vehicles, trucks and buses, or motorcycles.

The rubber composition having a correlation length $\Xi_b$ of 55 nm or less of the present invention may be prepared by a production method including a kneading step (A), a kneading step (B), and a vulcanization step. The kneading step (A) includes kneading an isoprene-based rubber with a vulcanization accelerator. The kneading step (B) includes kneading the kneaded mixture obtained in or after the kneading step (A) with sulfur. The vulcanization step includes vulcanizing the unvulcanized rubber composition obtained in or after the kneading step (B). A kneading step for adding other materials may be performed before the kneading step (A), between the kneading steps (A) and (B), or after the kneading step (B).

In the kneading step (A), a rubber component including an isoprene-based rubber and a vulcanization accelerator are preferably kneaded at a kneading temperature of 150 to 250° C. In this case, aggregates of the vulcanization accelerator may be broken and radicalized so that the vulcanization accelerator can bond to the rubber component, and therefore crosslinking initiation points can be formed homogeneously in the rubber composition. Moreover, since the isoprene-based rubber can generate stable tertiary radicals at the allylic position, it easily forms a bond to the vulcanization accelerator in the kneading step (A). Moreover, in conventional techniques, since vulcanization accelerators have higher solubilities in polybutadiene rubber (BR) or styrene butadiene rubber (SBR) than in isoprene-based rubbers, they will be localized in BR or SBR, thus making it difficult to form a homogeneously crosslinked structure. In contrast, the present invention may use the kneading step (A) to eliminate localization of vulcanization accelerators in BR or SBR, thereby enabling the formation of a homogeneously crosslinked structure. Due to the above-described effects, the homogeneity of the crosslinked structure is improved to give a smaller correlation length $\Xi_b$. Thus, the resulting rubber composition shows low energy loss, excellent fracture energy, and excellent abrasion resistance.

The kneading temperature in the present invention means the highest temperature during kneading. As described earlier, in the kneading step (A), the kneading temperature may be set at 150° C. or higher to reduce the correlation length $\Xi_b$, while the kneading temperature may be set at 250° C. or lower to inhibit thermal decomposition of the rubber component and scorching. To form a further homogeneously crosslinked structure that can be expected to provide further improved properties, the kneading temperature is preferably 160° C. or higher, more preferably 170° C. or higher, but is preferably 220° C. or lower, more preferably 200° C. or lower, still more preferably 190° C. or lower. The kneading temperature may be controlled, for example, by adding fillers or using temperature controllers.

In preparing the rubber composition of the present invention, the kneading temperature in the kneading step (A) does not necessarily have to be 150° C. or higher. Moreover, a kneading temperature of 150° C. or higher does not always provide the rubber composition of the present invention. In the kneading step (A), the kneading duration may be increased to enhance dispersion of the vulcanization accelerator in the rubber, thereby reducing the correlation length $\Xi_b$; moreover, the kneading temperature may be increased at the same time. Furthermore, the dispersion of the vulcanization accelerator may be further enhanced by using a masterbatch containing a rubber component and the vulcanization accelerator (vulcanization accelerator masterbatch). The correlation length $\Xi_b$ is difficult to reduce when the isoprene-based rubber content is low, e.g., less than 50% by mass of the total rubber component. With the above-described techniques, however, it is possible to obtain a rubber composition satisfying the correlation length $\Xi_b$ defined in the present invention. The following is provided as a guide for obtaining the rubber composition of the present invention: the preferred kneading temperature and duration are: higher than 150° C. and 10 minutes or longer, respectively, for a rubber component containing 80 to 100% by mass of an isoprene-based rubber; higher than 160° C. and 15 minutes or longer, respectively, for a rubber component containing at least 40% by mass but less than 80% by mass of an isoprene-based rubber; higher than 170° C. and 15 minutes or longer, respectively, for a rubber component containing at least 20% by mass but less than 40% by mass of an isoprene-based rubber; and for a rubber component containing less than 20% by mass of an isoprene-based rubber, it is preferred to adjust the kneading temperature and duration to higher than 170° C. and 15 minutes or longer, respectively, while using an additional rubber in the form of a vulcanization accelerator masterbatch.

Thus, the kneading duration in the kneading step (A) is not particularly critical and may be appropriately set within a range of 1 to 60 minutes. The kneading in the kneading step (A) may also be performed in any manner, e.g., by use of a known kneading machine such as a Banbury mixer, a kneader, or an open roll mill.

Additional rubbers other than the isoprene-based rubber may be introduced and kneaded in the kneading step (A). Materials usually used in rubber compositions, such as zinc oxide, stearic acid, carbon black, silica, silane coupling agents, antioxidants, oils, waxes, and processing aids, may also be kneaded in the kneading step (A). However, sulfur is preferably not introduced during or before the kneading step (A) but kneaded in the kneading step (B) to be able to inhibit scorching. The sulfur mentioned here is sulfur as a material usually used for tires, such as powdered sulfur, and does not refer to the sulfur atom in a vulcanization accelerator or silane coupling agent. Moreover, zinc oxide and stearic acid, which serve to inhibit reactions between rubber components and vulcanization accelerators, are preferably introduced and kneaded after the rubber component and the vulcanization accelerator are kneaded to some extent, preferably at least one minute after the temperature reaches 150 to 250° C., in the kneading step (A). Alternatively, they are preferably kneaded in a step separate from the kneading step (A), more preferably in the kneading step (B).

The kneading step (B) includes kneading the kneaded mixture obtained in or after the kneading step (A) with sulfur.

The kneading step (B) preferably includes kneading at 130° C. or lower. The introduction and kneading at a temperature of 130° C. or lower of sulfur in a step separate from that of vulcanization accelerators provides further inhibition of scorching. The lower limit of the kneading temperature is preferably 70° C. to improve dispersion of sulfur.

The kneading duration in the kneading step (B) is not particularly critical but is preferably 1 to 60 minutes. The kneading in the kneading step (B) may also be performed in any manner, e.g., by use of a known kneading machine such as a Banbury mixer, a kneader, or an open roll mill.

In the kneading step (B), it is sufficient that at least the kneaded mixture obtained in or after the kneading step (A) and sulfur be kneaded, optionally together with other materials. As described above, zinc oxide and stearic acid are preferably kneaded in the kneading step (B).

The vulcanization step includes vulcanizing the unvulcanized rubber composition obtained in or after the kneading step (B).

The kneaded mixture (unvulcanized rubber composition) obtained through kneading steps including the kneading steps (A) and (B) may be vulcanized by a usual method to obtain a vulcanized rubber composition. The conditions for the vulcanization are not particularly limited. Preferably, heating is performed at 100 to 180° C. for 5 to 60 minutes. For tire production, the unvulcanized rubber composition may be extruded into the shape of a tire component such as a tread and then formed and assembled with other tire components in a usual manner on a tire building machine to build an unvulcanized tire (green tire), which may then be heated and pressurized in a vulcanizer.

EXAMPLES

The present invention will be specifically described with reference to, but not limited to, examples.

The chemicals used in the examples and comparative examples are listed below.

Isoprene-based rubber (IR): Nipol IR 2200 available from Zeon Corporation

BR: Ubepol BR150B available from Ube Industries, Ltd.

SBR: Tufdene 3830 (containing 37.5 parts by mass of oil per 100 parts by mass of rubber solids) available from Asahi Kasei Corporation Carbon black: DIABLACK N550 ($N_2SA$: 42 $m^2/g$) available from Mitsubishi Chemical Corporation Silica: ULTRASIL VN3 available from Evonik Silane coupling agent: NXT (3-octanoylthiopropyl-triethoxysilane) available from Momentive Zinc oxide: zinc oxide #1 available from Mitsui Mining & Smelting Co., Ltd.

Stearic acid: stearic acid "TSUBAKI" available from NOF Corporation

Antioxidant: NOCRAC 6C (N-phenyl-N'-(1,3-dimethylbutyl)-p-phenylenediamine, 6PPD) available from Ouchi Shinko Chemical Industrial Co., Ltd.

Sulfur: powdered sulfur available from Karuizawa sulfur Co., Ltd.

Vulcanization accelerator: NOCCELER CZ (N-cyclohexyl-2-benzothiazolylsulfenamide, CZ) available from Ouchi Shinko Chemical Industrial Co., Ltd.

Vulcanization accelerator masterbatch: prepared by adding a vulcanization accelerator (NOCCELER CZ) to NR latex and solidifying the mixture (formulation: NR/vulcanization accelerator=100/2 (parts by mass)).

EXAMPLES AND COMPARATIVE EXAMPLES (First Kneading Step)

According to each of the formulations and kneading conditions shown in Tables 1 to 8, the total amounts of the rubber component and the vulcanization accelerator were kneaded using a Banbury mixer.

(Second Kneading Step)

The kneaded mixture obtained in the first kneading step was kneaded with the total amounts of the materials listed in Table 1 to 8 using a 3 L Banbury mixer at a kneading temperature of 100° C. for 15 minutes.

(Third Kneading Step)

The kneaded mixture obtained in the second kneading step was kneaded with the total amounts of the materials listed in Table 1 to 8 using an open two-roll mill at a kneading temperature of 100° C. for five minutes.

(Vulcanization Step)

The unvulcanized rubber composition obtained in the third kneading step was heated at 140° C. for 50 minutes using a pressing machine to obtain a vulcanized rubber composition.

The vulcanized rubber compositions prepared as above were evaluated as described below. The results are given in the lower parts of Tables 1 to 8.

<Sans Analysis>

A plate-like sample (molded product) having a thickness of about 1 mm, a length of about 16 mm, and a width of about 16 mm was swollen to equilibrium in deuterated toluene and attached to a sample holder. The sample was then irradiated with neutrons at room temperature. Absolute scattering intensity curves were obtained by measuring the sample at distances from the detector of 2.5 m and 10 m without and with a focusing lens, and then combined by least squares. These three curves were combined in the following manner: the scattering intensity curve obtained by measuring the sample at a distance from the detector of 2.5 m was fixed, and the scattering intensity curves obtained by measuring at a distance of 10 m without and with the focusing lens were shifted. The resulting scattering intensity curve I was fitted by least squares using Equations 1 to 6 to determine the correlation length $\Xi_b$.

(Sans Apparatus)
SANS: SANS device in SANS-J, which is a beamline at JRR-3 of the Japan Atomic Energy Agency, Independent Administrative Agency.
(Analysis Conditions)
Neutron wavelength: 6.5 Å
Flux density of neutrons: $9.9 \times 10^7$ neutrons/cm$^2$/s
Distance from sample to detector: 2.5 m and 10 m (The sample was also measured at a distance from the detector of 10 m using a focusing lens to obtain information at smaller angles.)
(Detector)
Two-dimensional detector ($^3$He two-dimensional detector and two-dimensional photomultiplier tube+ZnS/$^6$LiF detector)

<Tan δ Index at 60° C.>

The tan δ was measured using a spectrometer (Ueshima Seisakusho Co., Ltd.) at a dynamic strain amplitude of 1%, a frequency of 10 Hz, and a temperature of 60° C. The reciprocals of the tan δ values are expressed as an index in Tables 1 to 8, with Comparative Examples 1 to 8, respectively, set equal to 100. A higher index indicates less energy loss, and an index value of 100 or higher is considered good.

<Fracture Energy Index at 25° C.>

Rubber specimens punched out in a No. 3 dumbbell shape were pulled to fracture at a rate of 200 mm/min using an autograph (Shimadzu Corporation) to measure the elastic modulus (tensile strength at break) and elongation (elongation at break) at fracture. The measurement temperature was 25° C. The product of these two values was divided by two, and the quotient was defined as the fracture energy. The results are expressed as an index in Tables 1 to 8, with Comparative Examples 1 to 8, respectively, set equal to 100. A higher index indicates higher fracture energy, and an index value of 100 or higher is considered good.

<Abrasion Resistance Index>

The abrasion loss was measured using a Lambourn abrasion tester at room temperature, a load of 1.0 kgf, and a slip ratio of 30%. The reciprocals of the abrasion losses are expressed as an index in Tables 1 to 8, with Comparative Examples 1 to 8, respectively, set equal to 100. A higher index indicates higher abrasion resistance, and an index value of 100 or higher is considered good.

TABLE 1

| | | Example | | | | Comparative Example |
|---|---|---|---|---|---|---|
| | | 1 | 2 | 3 | 4 | 1 |
| First kneading step | IR | 100 | 100 | 100 | 100 | 100 |
| | BR | 0 | 0 | 0 | 0 | 0 |
| | SBR | 0 | 0 | 0 | 0 | 0 |
| | Vulcanization accelerator | 2 | 2 | 2 | 2 | 2 |
| | Kneading temperature (° C.) | 160 | 171 | 195 | 166 | 150 |
| | Kneading duration (min) | 10 | 10 | 10 | 10 | 10 |
| Second kneading step | Carbon black | 50 | 50 | 50 | 5 | 50 |
| | Silica | 0 | 0 | 0 | 70 | 0 |
| | Silane coupling agent | 0 | 0 | 0 | 5 | 0 |
| | Antioxidant | 1 | 1 | 1 | 1 | 1 |
| Third kneading step | Zinc oxide | 3 | 3 | 3 | 3 | 3 |
| | Stearic acid | 4 | 4 | 4 | 4 | 4 |
| | Sulfur | 2 | 2 | 2 | 2 | 2 |
| Vulcanized properties | Ξb | 19 | 14 | 21 | 22 | 61 |
| | tan δ index at 60° C. | 118 | 142 | 112 | 131 | 100 |
| | Fracture energy index at 25° C. | 143 | 184 | 133 | 150 | 100 |
| Properties | Abrasion resistance index | 145 | 188 | 136 | 151 | 100 |

TABLE 2

| | | Example | | | Comparative Example |
|---|---|---|---|---|---|
| | | 5 | 6 | 7 | 2 |
| First kneading step | IR | 75 | 75 | 75 | 75 |
| | BR | 25 | 25 | 25 | 25 |
| | SBR | 0 | 0 | 0 | 0 |
| | Vulcanization accelerator | 2 | 2 | 2 | 2 |

TABLE 2-continued

|  |  | Example | | | Comparative Example |
|---|---|---|---|---|---|
|  |  | 5 | 6 | 7 | 2 |
|  | Kneading temperature (° C.) | 160 | 161 | 151 | 149 |
|  | Kneading duration (min) | 10 | 15 | 20 | 10 |
| Second kneading step | Carbon black | 50 | 50 | 50 | 50 |
|  | Silica | 0 | 0 | 0 | 0 |
|  | Silane coupling agent | 0 | 0 | 0 | 0 |
|  | Antioxidant | 1 | 1 | 1 | 1 |
| Third kneading step | Zinc oxide | 3 | 3 | 3 | 3 |
|  | Stearic acid | 4 | 4 | 4 | 4 |
|  | Sulfur | 2 | 2 | 2 | 2 |
| Vulcanized properties | Ξ b | 30 | 24 | 28 | 66 |
|  | tan δ index at 60° C. | 111 | 120 | 113 | 100 |
|  | Fracture energy index at 25° C. | 132 | 150 | 135 | 100 |
| Properties | Abrasion resistance index | 131 | 148 | 133 | 100 |

TABLE 3

|  |  | Example | | | Comparative Example |
|---|---|---|---|---|---|
|  |  | 8 | 9 | | 3 |
| First kneading step | IR | 50 | 50 | | 50 |
|  | BR | 50 | 50 | | 50 |
|  | SBR | 0 | 0 | | 0 |
|  | Vulcanization accelerator | 2 | 2 | | 2 |
|  | Kneading temperature (° C.) | 161 | 196 | | 151 |
|  | Kneading duration (min) | 10 | 10 | | 10 |
| Second kneading step | Carbon black | 50 | 50 | | 50 |
|  | Silica | 0 | 0 | | 0 |
|  | Silane coupling agent | 0 | 0 | | 0 |
|  | Antioxidant | 1 | 1 | | 1 |
| Third kneading step | Zinc oxide | 3 | 3 | | 3 |
|  | Stearic acid | 4 | 4 | | 4 |
|  | Sulfur | 2 | 2 | | 2 |
| Vulcanized properties | Ξ b | 39 | 45 | | 71 |
|  | tan δ index at 60° C. | 108 | 107 | | 100 |
|  | Fracture energy index at 25° C. | 127 | 125 | | 100 |
| Properties | Abrasion resistance index | 125 | 122 | | 100 |

TABLE 4

|  |  | Example 10 | Comparative Example 4 |
|---|---|---|---|
| First kneading step | IR | 40 | 40 |
|  | BR | 60 | 60 |
|  | SBR | 0 | 0 |
|  | Vulcanization accelerator | 2 | 2 |
|  | Kneading temperature (° C.) | 164 | 150 |
|  | Kneading duration (min) | 15 | 10 |
| Second kneading step | Carbon black | 50 | 50 |
|  | Silica | 0 | 0 |
|  | Silane coupling agent | 0 | 0 |
|  | Antioxidant | 1 | 1 |
| Third kneading step | Zinc oxide | 3 | 3 |
|  | Stearic acid | 4 | 4 |
|  | Sulfur | 2 | 2 |
| Vulcanized properties | Ξ b | 41 | 72 |
|  | tan δ index at 60° C. | 106 | 100 |
|  | Fracture energy index at 25° C. | 122 | 100 |
| Properties | Abrasion resistance index | 120 | 100 |

TABLE 5

|  |  | Example 11 | Comparative Example 5 |
|---|---|---|---|
| First kneading step | IR | 20 | 20 |
|  | BR | 10 | 10 |
|  | SBR | 96.25 | 96.25 |
|  | Vulcanization accelerator | 2 | 2 |
|  | Kneading temperature (° C.) | 171 | 151 |
|  | Kneading duration (min) | 15 | 10 |
| Second kneading step | Carbon black | 50 | 50 |
|  | Silica | 0 | 0 |
|  | Silane coupling agent | 0 | 0 |
|  | Antioxidant | 1 | 1 |
| Third kneading step | Zinc oxide | 3 | 3 |
|  | Stearic acid | 4 | 4 |
|  | Sulfur | 2 | 2 |
| Vulcanized properties | Ξ b | 52 | 81 |
|  | tan δ index at 60° C. | 104 | 100 |
|  | Fracture energy index at 25° C. | 115 | 100 |
| Properties | Abrasion resistance index | 115 | 100 |

TABLE 6

|  |  | Example 12 | Comparative Example 6 |
|---|---|---|---|
| First kneading step | IR | 50 | 50 |
|  | BR | 50 | 50 |
|  | SBR | 0 | 0 |
|  | Vulcanization accelerator | 2 | 0 |
|  | Kneading temperature (° C.) | 161 | 161 |
|  | Kneading duration (min) | 10 | 10 |
| Second kneading step | Carbon black | 50 | 50 |
|  | Silica | 0 | 0 |
|  | Silane coupling agent | 0 | 0 |
|  | Antioxidant | 1 | 1 |
| Third kneading step | Zinc oxide | 3 | 3 |
|  | Stearic acid | 4 | 4 |
|  | Sulfur | 2 | 2 |
|  | Vulcanization accelerator | 0 | 2 |
| Vulcanized properties | Ξ b | 39 | 73 |
|  | tan δ index at 60° C. | 110 | 100 |
|  | Fracture energy index at 25° C. | 129 | 100 |
| Properties | Abrasion resistance index | 127 | 100 |

TABLE 7

|  |  | Example 13 | Comparative Example 7 |
|---|---|---|---|
| First kneading step | IR | 15 | 15 |
|  | BR | 15 | 15 |
|  | SBR | 96.25 | 96.25 |
|  | Vulcanization accelerator | 2 | 2 |
|  | Kneading temperature (° C.) | 180 | 150 |
|  | Kneading duration (min) | 20 | 10 |
| Second kneading step | Carbon black | 50 | 50 |
|  | Silica | 0 | 0 |
|  | Silane coupling agent | 0 | 0 |
|  | Antioxidant | 1 | 1 |
| Third kneading step | Zinc oxide | 3 | 3 |
|  | Stearic acid | 4 | 4 |
|  | Sulfur | 2 | 2 |
| Vulcanized properties | Ξ b | 53 | 82 |
|  | tan δ index at 60° C. | 103 | 100 |
|  | Fracture energy index at 25° C. | 114 | 100 |
| Properties | Abrasion resistance index | 114 | 100 |

TABLE 8

| | | Example 14 | Comparative Example 8 |
|---|---|---|---|
| First kneading step | IR | 0 | 100 |
| | Vulcanization accelerator masterbatch | 102 | 0 |
| | Vulcanization accelerator | 0 | 2 |
| | Kneading temperature (° C.) | 160 | 150 |
| | Kneading duration (min) | 10 | 10 |
| Second kneading step | Carbon black | 50 | 50 |
| | Silica | 0 | 0 |
| | Silane coupling agent | 0 | 0 |
| | Antioxidant | 1 | 1 |
| Third kneading step | Zinc oxide | 3 | 3 |
| | Stearic acid | 4 | 4 |
| | Sulfur | 2 | 2 |
| Vulcanized properties | Ξ b | 15 | 61 |
| | tan δ index at 60° C. | 125 | 100 |
| | Fracture energy index at 25° C. | 150 | 100 |
| Properties | Abrasion resistance index | 153 | 100 |

As shown in Tables 1 to 8, all the properties were improved in the examples with a correlation length $\Xi_b$ of 55 nm or less, as compared to the respective reference comparative examples. Thus, there seemed to be no significant decrease in the properties caused by excessive thermal decomposition of the rubber component.

Moreover, similar results were obtained when the correlation length $\Xi_b$ was determined from a scattering intensity curve I obtained by SAXS analysis.

The invention claimed is:

1. A rubber composition for tires, comprising a rubber component including an isoprene-based rubber, the rubber composition being formed by a method that includes kneading at a temperature of 160° C. to 196° C. the isoprene-based rubber with a vulcanization accelerator followed by kneading with sulfur in order to obtain a correlation length $\Xi_b$ of 55 nm or less as determined by fitting the following Equations 1 to 6 to a scattering intensity curve I(q) obtained by X-ray scattering analysis or neutron scattering analysis:

$$I_{(q)} = \frac{A}{1+q^2\xi^2} + \frac{B}{(1+q^2\Xi_b^2)^2} + \frac{C}{(1+q^2\Xi_c^2)^2} \quad \text{(Equation 1)}$$

$$\xi < \Xi_b < \Xi_c \quad \text{(Equation 2)}$$

$$A = 8\pi N_a \sigma^2 \xi^3 \quad \text{(Equation 3)}$$

$$B = 4\pi N_b \sigma^2 \Xi_b^2 \quad \text{(Equation 4)}$$

$$C = 4\pi N_c \sigma^2 \Xi_c^2 \quad \text{(Equation 5)}$$

$$q = \frac{4\pi \sin\frac{\theta}{2}}{\lambda} \quad \text{(Equation 6)}$$

$A, B, C, \xi, \Xi_b, \Xi_c$: fitting parameter $q$: scattering vector $N_a$: number per unit volume (number/cm³)
 of scatterers having a correlation length $\xi$ $N_b$: number per unit volume (number/cm³)
 of scatterers having a correlation length $\Xi_b$ $N_c$: number per unit volume (number/cm³)
 of scatterers having a correlation length $\Xi_c$ $\sigma$: electron density difference (electron·(cm⁻³))
 between scatterers and the surrounding matrix,
 or scattering length density difference (cm⁻²) between
 scatterers and the surrounding deuterated solvent $\theta$: scattering angle $\lambda$: wavelength of X rays or neutrons 2. The rubber composition for tires according to claim 1, wherein the X-ray scattering analysis is small-angle X-ray scattering analysis, and the neutron scattering analysis is small-angle neutron scattering analysis.

3. The rubber composition for tires according to claim 1, wherein the value of q defined by Equation 6 is 10 nm⁻¹ or less.

4. A tire, comprising the rubber composition for tires according to claim 1.

* * * * *